C. J. HUNSTAD.
LEAK PROOF OIL WASHER.
APPLICATION FILED OCT. 20, 1919.
1,339,762.
Patented May 11, 1920.
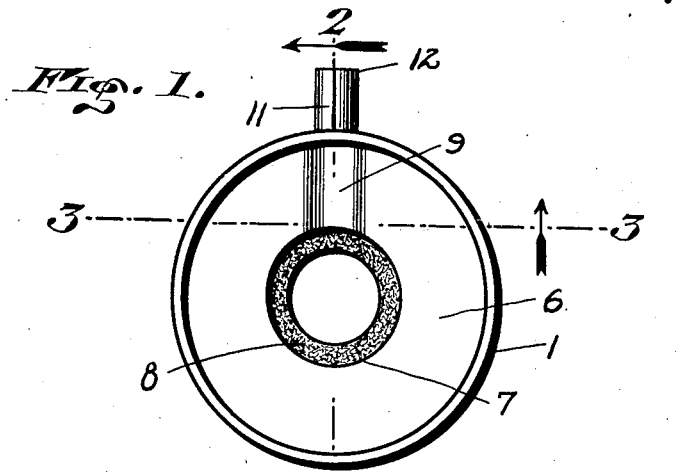
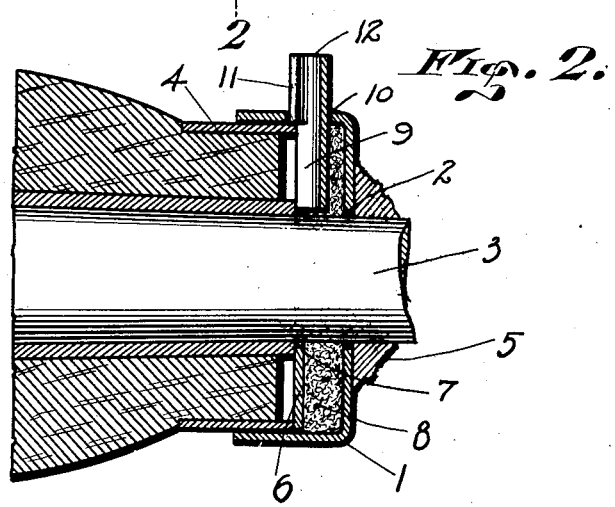
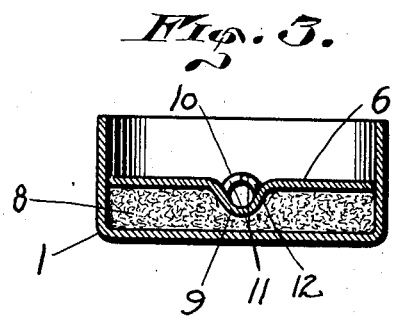
WITNESS:
*Thos. W. Riley*
INVENTOR.
*Clarence J. Hunstad*
BY *W. J. Fitz Gerald*
ATTORNEY.

UNITED STATES PATENT OFFICE.

CLARENCE J. HUNSTAD, OF GUTTENBERG, IOWA.

LEAK-PROOF OIL-WASHER.

1,339,762.                         Specification of Letters Patent.          Patented May 11, 1920.

Application filed October 20, 1919. Serial No. 331,801.

*To all whom it may concern:*

Be it known that I, CLARENCE J. HUNSTAD, a citizen of the United States, residing at Guttenberg, in the county of Clayton and State of Iowa, have invented certain new and useful Improvements in Leak-Proof Oil-Washers; and I do hereby declare the following to be a full, clear, and exact description of the invention, such as will enable others skilled in the art to which it appertains to make and use the same.

The present invention relates to a packing washer which is oil tight, so as to prevent leakage of oil or lubricant past the washer, it being the object of the invention to provide a novel and improved washer adapted especially for use on the rear axles of automobiles, and the like, for the purpose of retaining the lubricant.

By the use of the present device, which can be easily manufactured and quickly applied, the lubricant is retained in the differential casing, and roller bearings next to the drive wheels of an automobile. Washers ordinarily used do not make provision against the leakage of oil from the rear axle housing, resulting in the dripping of the lubricant on the rear wheels, and tires, not only making the rear wheels unsightly, but also resulting in the rotting of the tires. This is due to the fact that when grease is put in the rear axle housing, it is cold, and when the gears operate, the grease warms up causing expansion and pressure, which not infrequently forces the oil out through the path of least resistance, which is at one side or the other near the rear drive wheels. Although the washer is intended especially for use for preventing the escape of lubricant from the ends of the rear axle housing, it can be used for other purposes.

Another object is the provision of such a washer having provision for the expansion and contraction of the grease and air within the axle housing, the washer having a novel vent for that purpose.

A still further object is the provision of such a washer consisting of sheet metal parts, which can be readily stamped out of sheet metal and fitted together, with packing between them to prevent leakage, and said parts being fitted together in a novel manner and being provided with the vent.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a face view of the improved washer.

Fig. 2 is a median diametrical section of the washer as in use, taken on the line 2—2 of Fig. 1.

Fig. 3 is a section taken on the line 3—3 of Fig. 1.

The washer comprises a cup-shaped member or cap 1 preferably stamped from sheet metal, and having a central opening 2 for the passage of the axle or spindle 3 or other shaft or member mounted for rotation within the member 4, such as the rear axle housing of an automobile, wheel hub, or the like. The member or cap 1 is fitted on the end of the member 4 so that the rim of the cap 1 tightly embraces said member 4, with the shaft or axle 3 extending through the opening 2, and the hub 5 or other part on said axle or shaft can bear against the cap 1. The cap 1 can thus be fitted on the end of the rear axle housing, on the end of a wheel hub or other part for retaining the lubricant therein, by the provision of means which will be presently described.

Fitted within the cap or member 1 is an annular plate or flat ring 6, preferably stamped from sheet metal, and having the opening 7 registering with the opening 2 for the passage of the axle or shaft 3, and an annular packing 8 of felt or other equivalent material is disposed between the plate 6 and cap 1 to embrace the shaft or axle 3 and prevent leakage along said shaft past the washer. The plate 6 can bear against the end of the housing, hub or other member 4, when the cap 1 is fitted thereon, and the packing in being compressed between the two members of the washer will embrace the shaft 3. The washer will therefore retain oil within the member against which the washer is fitted, to prevent the leaking and dripping of lubricant.

In order to provide a vent to allow for expansion and contraction of the grease and air, which takes place within the axle housing, the plate 6 is provided with a radial channel 9 struck toward the cap 1, and said channel portion extends beyond the outer edge of the plate 6 through an aperture 10 provided in the rim of the cap, said extension having the flaps 11 which are bent toward one another to provide a vent tube or pipe 12 having its inner end located within the aperture 10, and the channel 9 establishes communication between said tube and the interior of the housing or member 4. It is preferable to arrange the washer with the tube or pipe 12 extending upwardly, so as to avoid the leakage of lubricant through the vent, but permitting the ingress and egress of air as the grease becomes cold and is heated, respectively. This will avoid the accumulation of pressure within the housing, which is the usual cause of the lubricant being expelled.

The cap 1 and plate 6 can be readily stamped from sheet metal, and after the packing 8 is placed in the cap, the plate 6 can be readily inserted, the tube or nipple 12 being moved outwardly through the aperture 10. The washer is then to be placed on the end of the axle housing, hub or other part in which the lubricant is to be maintained. The washer can be readily applied by slipping it over the end of the shaft or axle 3 and moving the cap 1 over the end of the housing or member 4, tapping the cap 1 with the hammer or other implement gently until it is driven home.

Having thus described the invention, what is claimed as new is:—

1. A leak proof washer comprising a cap to fit over the end of a housing or other member, a plate fitted within said cap having a vent portion communicating with the atmosphere, and packing between said plate and cap, said cap and plate having central openings.

2. A leak proof washer comprising parts, one fitted loosely within the other, and packing between said parts, the first named part having a portion leading through the other part and providing a vent.

3. A leak proof washer comprising a cap to fit over the end of the housing or member, an annular plate fitting within said cap, the cap having a central opening, and packing between said plate and cap, said plate having a portion extending outwardly through the cap and forming a vent.

4. A leak proof washer comprising a cap having a central opening and an aperture in its rim, an annular plate fitted within the cap and having a vent portion extending outwardly through said aperture, and packing between said plate and cap.

5. A leak proof washer comprising a cap to fit over a housing or other member, and having a central opening and aperture in its rim, an annular plate fitted within said cap and having a channel extending to said aperture and a tube extending from said channel through the aperture to constitute a vent, and packing between said plate and cap.

In testimony whereof I have signed my name to this specification in the presence of two subscribing witnesses.

CLARENCE J. HUNSTAD.

Witnesses:
CHAS. E. SCHOLZ,
C. J. ADAM.